United States Patent [19]
Won-Kim

[11] Patent Number: 5,474,190
[45] Date of Patent: Dec. 12, 1995

[54] ROTATING VIDEO CASSETTE ORGANIZER

[76] Inventor: Jung Won-Kim, 20620 Anza Ave. #27, Torrance, Calif. 90503

[21] Appl. No.: 254,519
[22] Filed: Jun. 6, 1994
[51] Int. Cl.$^6$ ........................................................ A47F 7/00
[52] U.S. Cl. ................................................. 211/41; 211/184
[58] Field of Search ........................................ 211/40, 41, 43, 211/87, 88, 71, 184, 43, 11; 108/60, 61

[56] References Cited

U.S. PATENT DOCUMENTS 5,031,780  7/1991  Lemmerman et al. .
5,292,010  3/1994  Pickles et al. ............................. 211/41
5,325,792  7/1994  Mulloy ..................................... 211/43

Primary Examiner—Alvin C. Chin-Shue
Assistant Examiner—Sarah L. Purol
Attorney, Agent, or Firm—Eugene Oak

[57] ABSTRACT

The present invention is a shelf designed to house a large number of video cassette cases. Video shelves generally utilize one of two methods to house video cassette cases, the first method being space-efficient but lacking visibility of the front or back cover of each case, the second method having the convenience of visibility of the front or back cover of each case but lacking the ability to collapse for space-efficiency. The presently invented video cassette organizer solves this problem by means of a mechanism which is able to house the entire row of video cases at a variety of positions by means of dividers which can be rotated. In addition, the shelf has an outer tray which allows video cassettes to be positioned so that the front or back of each case is fully visible.

1 Claim, 5 Drawing Sheets 5,474,190

ROTATING VIDEO CASSETTE ORGANIZER

FIELD OF THE INVENTION

The present invention generally relates to a shelf, particularly to a shelf which can accommodate a large number of video cases, and is able to hold each video case in a wide range of positions.

BACKGROUND OF THE INVENTION

It is a commonly known fact that video stores and rental outlets, as well as other establishments which either sell or rent video cassettes, require some method of displaying video cassettes. It is also known that the more popular and newly released videos should be displayed more visibly while the less popular and older videos can be stored in a more space-saving manner.

Many shelves have been designed with the purpose of storing as well as displaying video cassettes, but these shelves are often very limited in what they are able to do. For example, a video shelf known in the art has been designed for an improved display module which has at least one opening in a wall that would otherwise define a recess for insertion of a video cassette being disclosed in U.S. Pat. No. 5,031,780, issued Jul. 16, 1991.

A commonly used video shelf is one which is very similar to a book shelf, able to hold videos with either the side or the front cover visible. While this type of shelf allows videos to be placed in two different positions, the videos placed upon it can easily become disorganized and unkempt because they are not secured individually.

Another type of shelf which is quite common is one which is able to house videos with either partial or full visibility of the front or back cover of each video case. Although this type of shelf visibly displays videos while securing each individual video case, it is unable to store videos in a space-saving manner.

The presently invented video shelf provides the space-saving ability of the first shelf described as well as the convenient visibility of the second shelf described by housing an entire row of video cases at a variety of positions by means of dividers which can be rotated at various angles. It also has a unique visual appeal to retailers and consumers alike.

SUMMARY OF THE INVENTION

The present invention is a shelf which provides a method for displaying video cassettes in a variety of positions.

The presently invented apparatus is comprised of a shelf with inner grooves which is able to house a plurality of female objects, each of which consists of four protruding ends. A circular male end connected to a trapezoid video divider is inserted into the female part, enabling each video cassette to be individually divided. The circular male end can be inserted into the female end at a number of different angles, thereby allowing the entire row of videos to be displayed in a variety of positions. When a video cassette is positioned at an angle the back grooves which are perpendicular to the base of the shelf serves as guard rails for the product. Separate shelves can be linked together by means of two square connectors on one side which can be attached to two corresponding apertures in another shelf. An outer tray piece provides support for videos which are housed in a face-out position.

Accordingly, it is a primary object of the invention to provide a video shelf which is able to accommodate and display a large number of videos.

It is a further object of the present invention to provide a shelf which houses video cases in a compact, space-saving manner.

It is still a further object of the present invention to provide a shelf which is able to partially display either the front or the back cover of each video case housed within it.

It is an additional object of the present invention to provide a shelf which can display videos at various angles.

It is an additional object of the present invention to provide a shelf which can expand by being linked with other identical shelves.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE PREFERRED EMBODIMENT

The invention will be better understood and objects other than those set forth above will become apparent when consideration is given to the following detailed description thereof. Such description makes reference to the annexed drawing wherein.

DESCRIPTION OF THE PREFERRED EMBODIMENT

Figure 1:
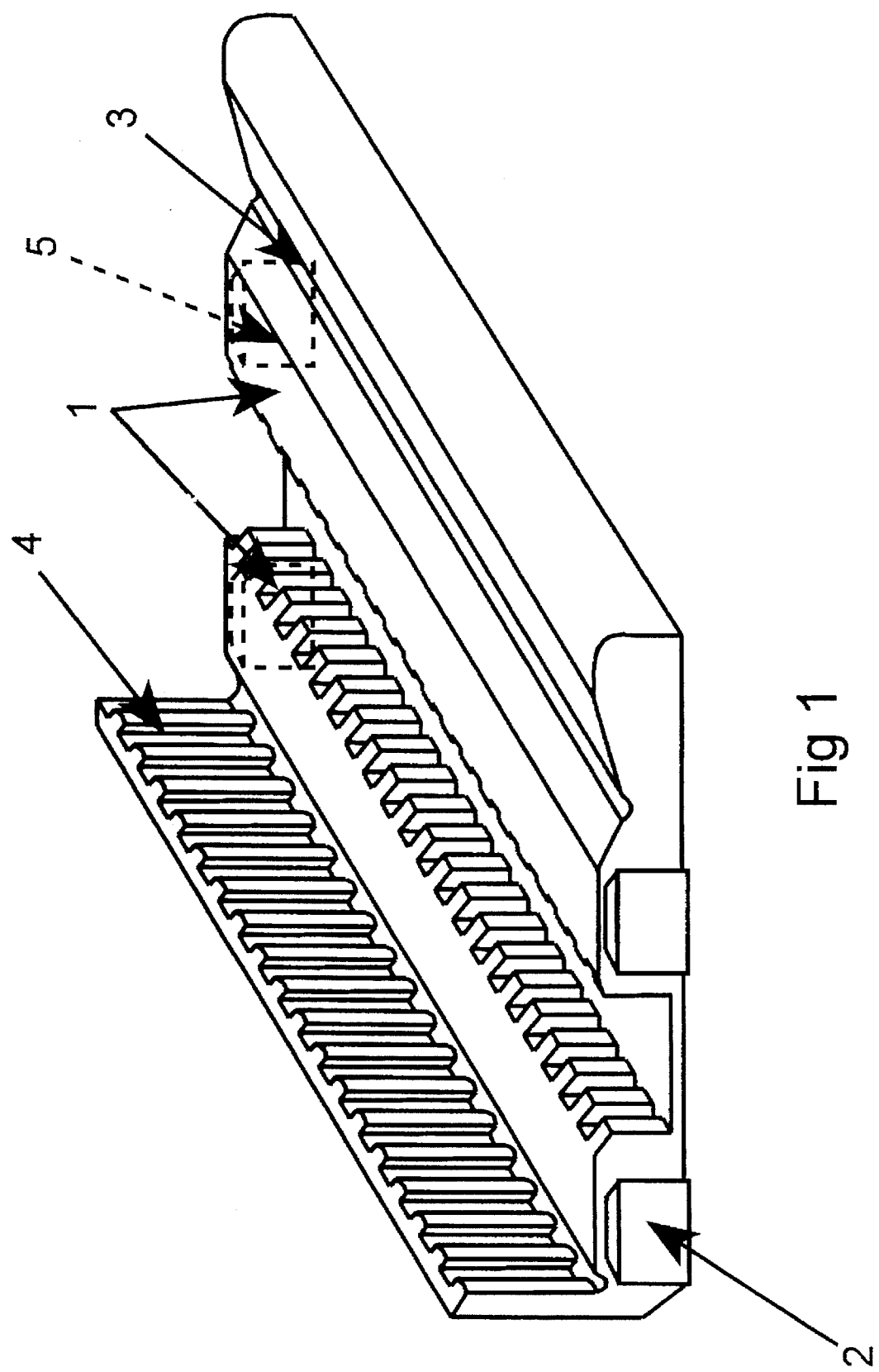
FIG. 1 is a perspective view of a video shelf in accordance with the present invention.
Figure 3:
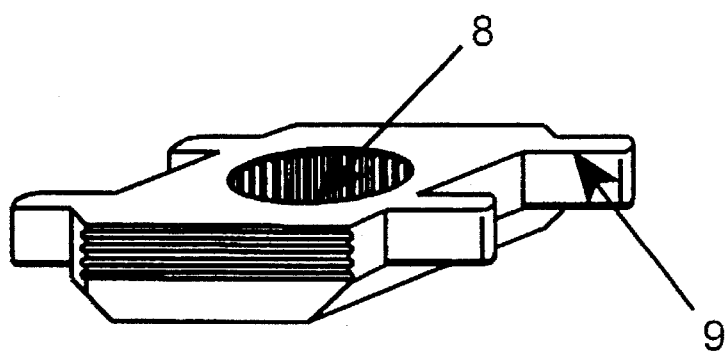
FIG. 3 is a perspective view of a female end with four protruding wings.
Figure 4:
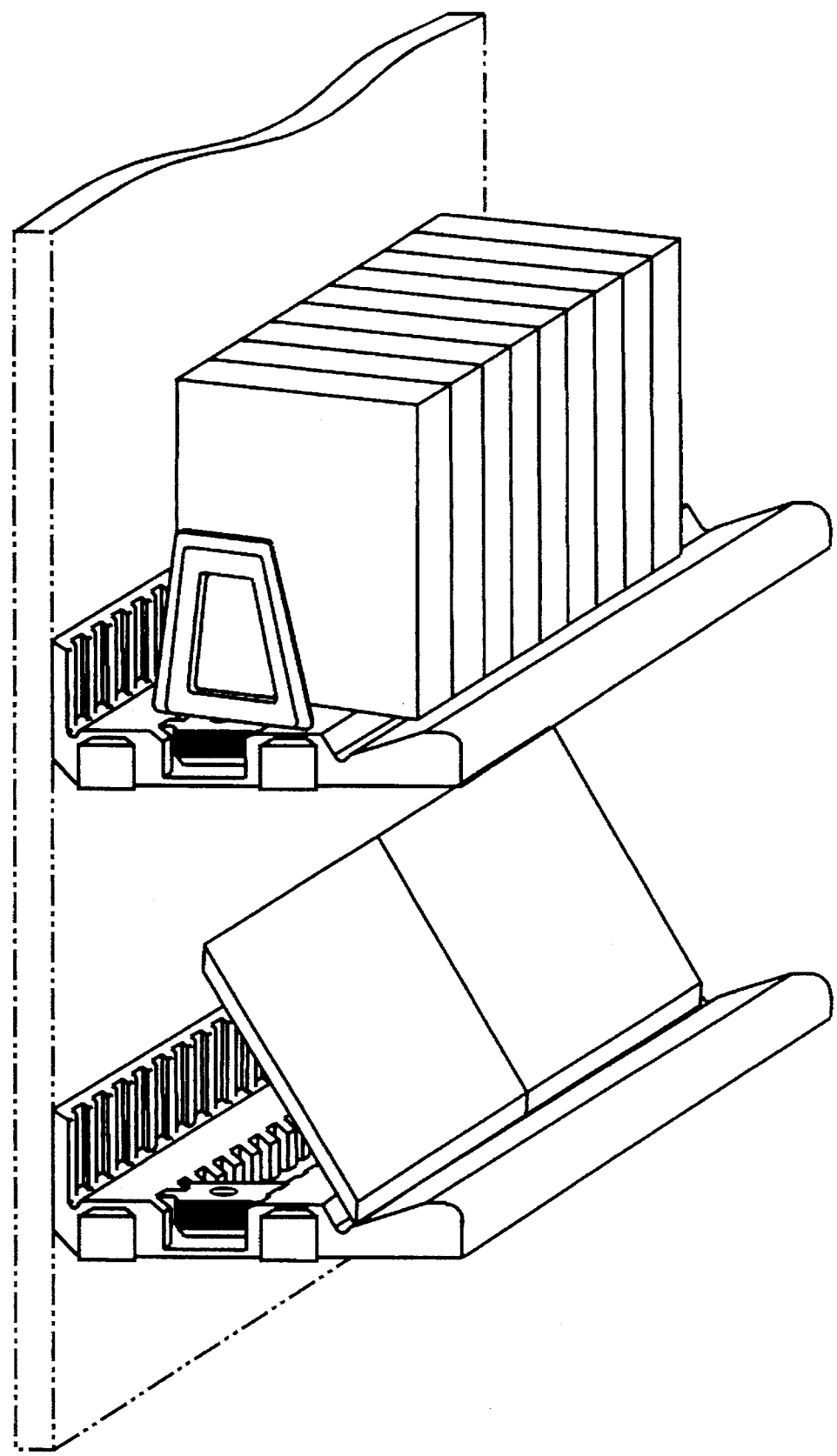
FIG. 4 is a perspective view of the video shelf with the completed attached parts showing the various ways a video cassette can be positioned at both a space-saving position and a faced-out position.
Figure 7:
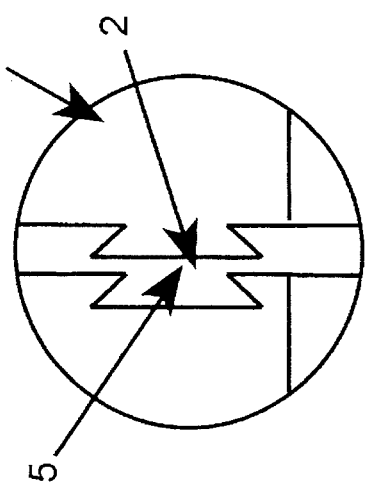
FIG. 7 is an enlarged view of connector and corresponding aperture.

With reference now to FIG. 1, the video shelf is approximately one (1) foot long and can be attached continuously with other shelves. Each shelf has two connectors 2 on one end and two apertures 5 on the other end. The two connectors 2 of one shelf can be inserted into two corresponding apertures 5 of another shelf to increase the length of the video shelf as shown in FIG. 7. Of course, the dimensions and features noted are exemplary and may be varied herein as may be appropriate. Inner grooves 1 will create an attachment for the four protruding wings 9 of the female end 8, shown in FIG. 3. Connectors 2 can be used to combine shelves from the left or right in order to extend the length of space available for video cassettes by inserting it into the apertures 5 on one side of another shelf. By lifting one shelf slightly higher than the corresponding shelf, the connectors 2 will be easily inserted into apertures 5. The shelf consists of two connectors 2 on one side and two apertures 5 on the other side. A tray 3 of the shelf helps position and stabilize the video cassette for display purposes as shown in FIG. 4. This tray 3 forms a face-out display position for a video cassette, and the tilt allows the cassette to lean into the unit and not fall forward. The back inner grooves 4 sustain the back edge of the video cassettes and prevent them from falling backwards.

Figure 2:
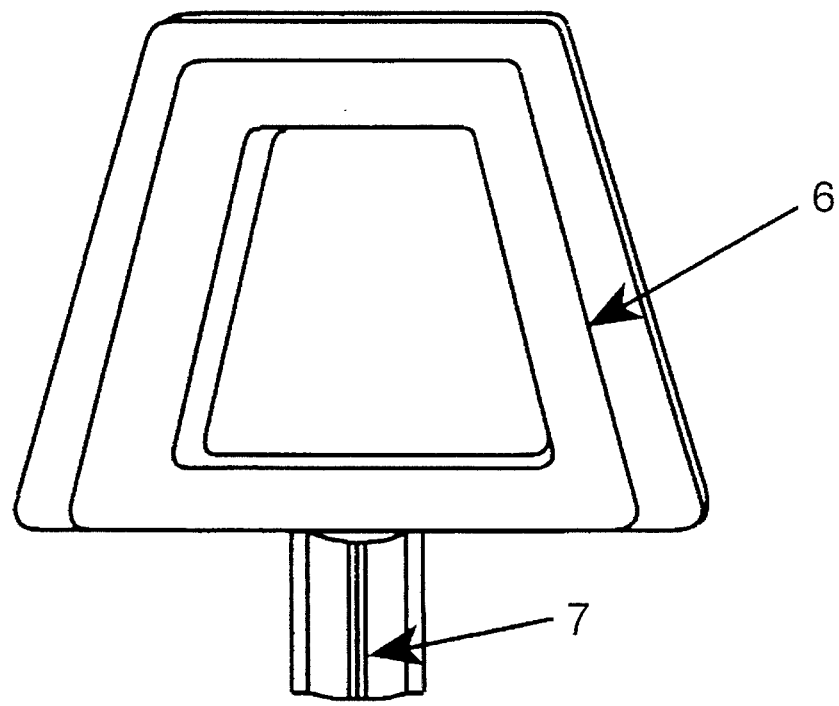
FIG. 2 is a perspective view of a trapezoid video divider with the circular male end.

Now referring to FIG. 2, the trapezoid piece 6 serves as a divider between each video cassette. Rotation of each divider is done manually by inserting each male end with inner grooves 7 at a specified angle within a corresponding female end 8, shown in FIG. 3. The female end contains a hole with inner grooves 8 which is used as an opening into which the male end 7 is to be inserted. Four protruding wings 9 are to be inserted into the inner grooves 1 of the horizontal shelf as shown in FIG. 4.

Figure 5:
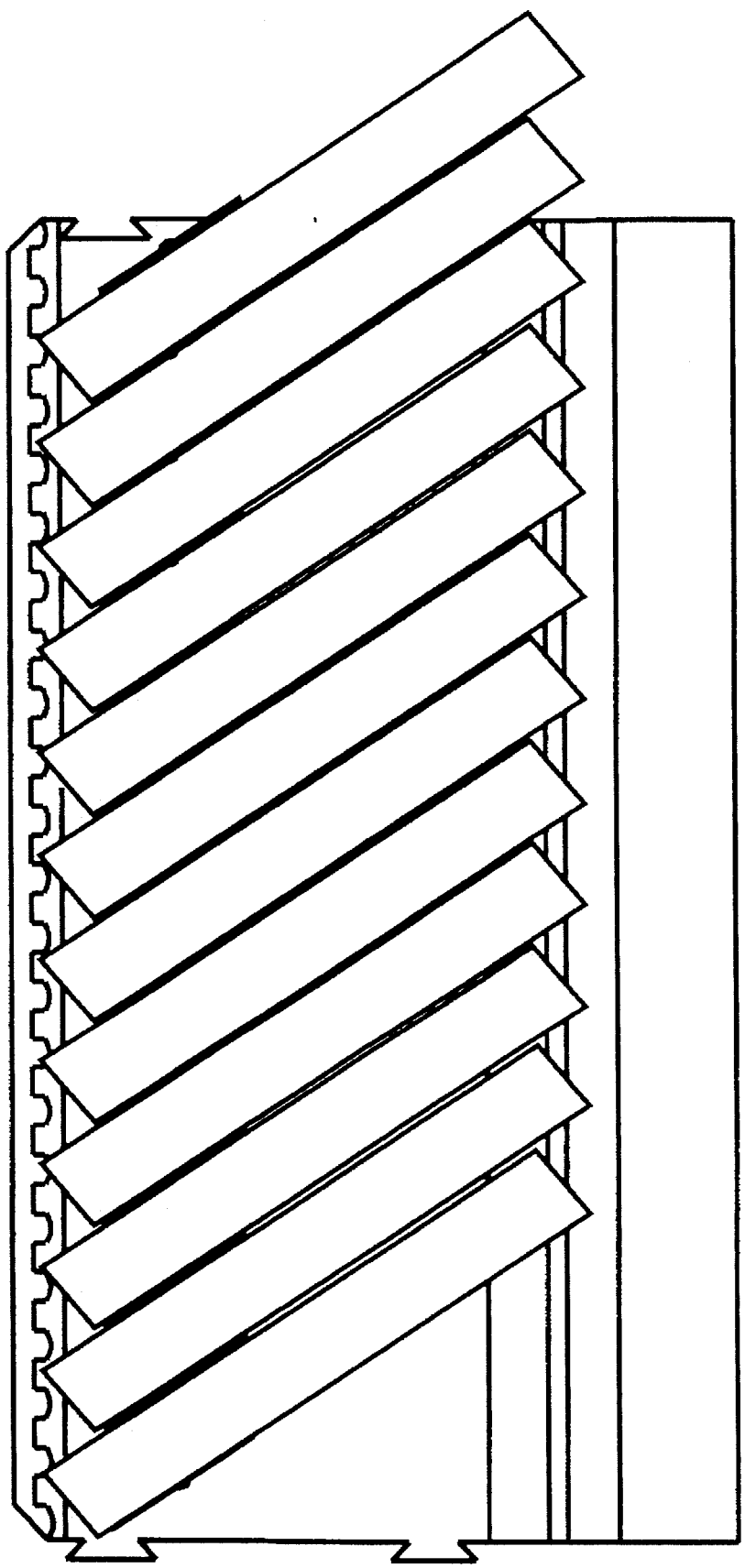
FIG. 5 is a top view of the video shelf showing the positioning of video cassettes when they are individually arranged by the trapezoid piece dividers.

Now referring to FIG. 4, a perspective view of the video shelf with the completed attached parts is shown. Video cassettes are positioned between two trapezoid dividers 6 at a space-saving position. Video cassettes can be displayed in a faced-out position against the outer tray 3 only when other video cassettes are not displayed in the back grooves as shown in FIG. 4. FIG. 5 is a top view of the video shelf showing how the video cassettes are arranged individually at a slant position with the aid of trapezoid dividers.

Figure 6:
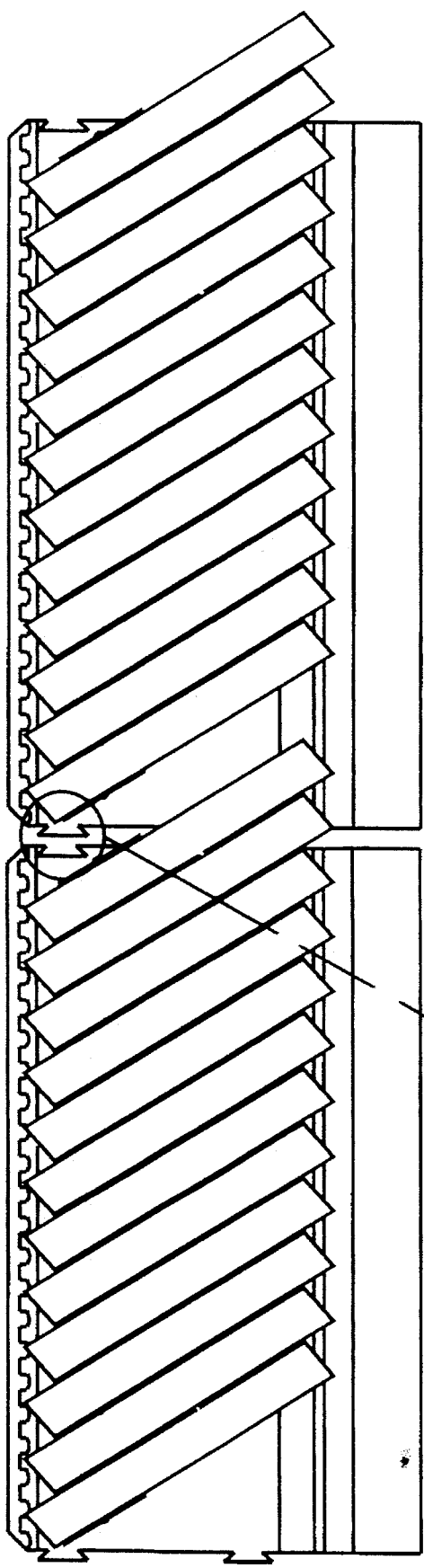
FIG. 6 is a top view of two shelves showing how connectors on one shelf can be attached to two corresponding apertures of another shelf to horizontally extend the length.

FIG. 6 is a top view of the two connectors 2 of one shelf being inserted into two corresponding apertures 5 of another shelf to extend the length of the video shelf in a horizontal manner. Extension is feasible by slightly lifting one video shelf and sliding the connectors 2 into the corresponding apertures 5 of another shelf.

I claim:

1. An apparatus to accommodate a large number of videos cases at a variety of different angles comprising:

a rectangularly shaped shelf having a base and a back wall extending perpendicular thereof with inner grooves in the base and back wall side;

a female end which has four extended protruding wings to be inserted into the inner grooves located in the base of said shelf;

a trapezoid video cassette divider with a male end that can be inserted into said female end;

two connectors extending from one edge of said shelf and two apertures within the other edge of said shelf;

an outer tray piece with a tilt that is part of the front of said shelf.

* * * * *